June 2, 1925.  
A. DEBAY  
WINDMILL  
Filed Jan. 19, 1924 2 Sheets-Sheet 1
1,540,609
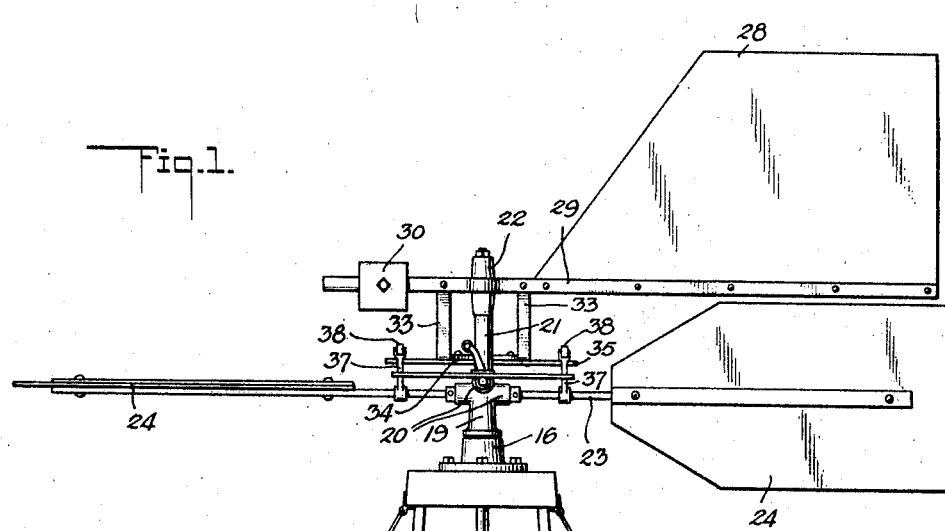
Fig.1.
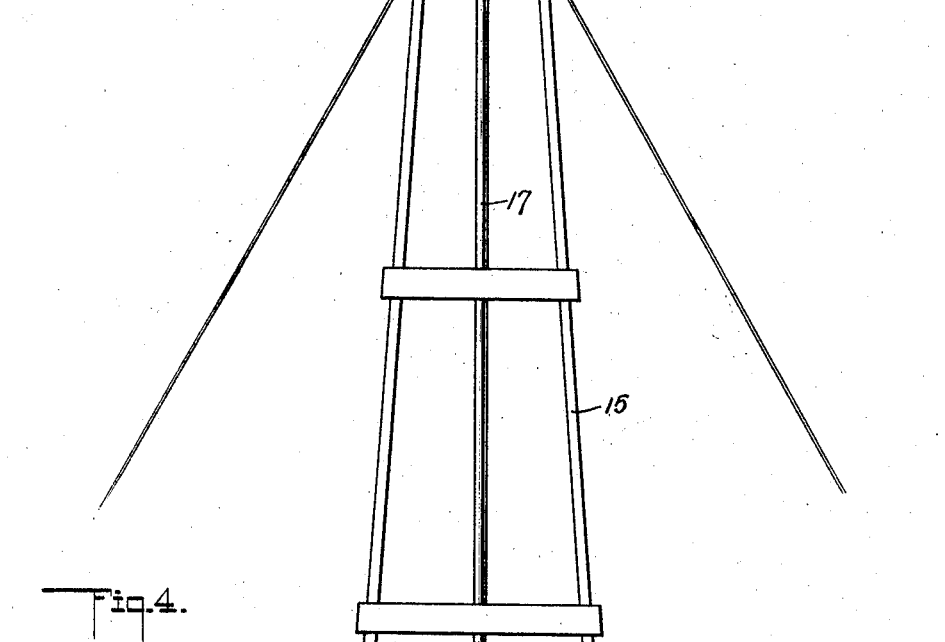
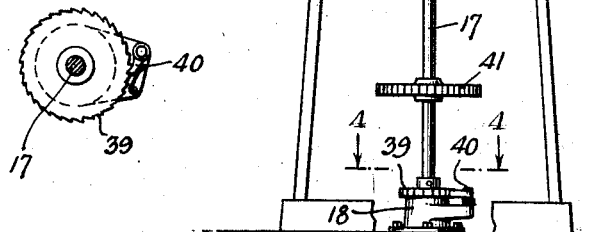
Fig.4.
INVENTOR  
ALFRED DEBAY  
BY Munn & Co.  
ATTORNEYS

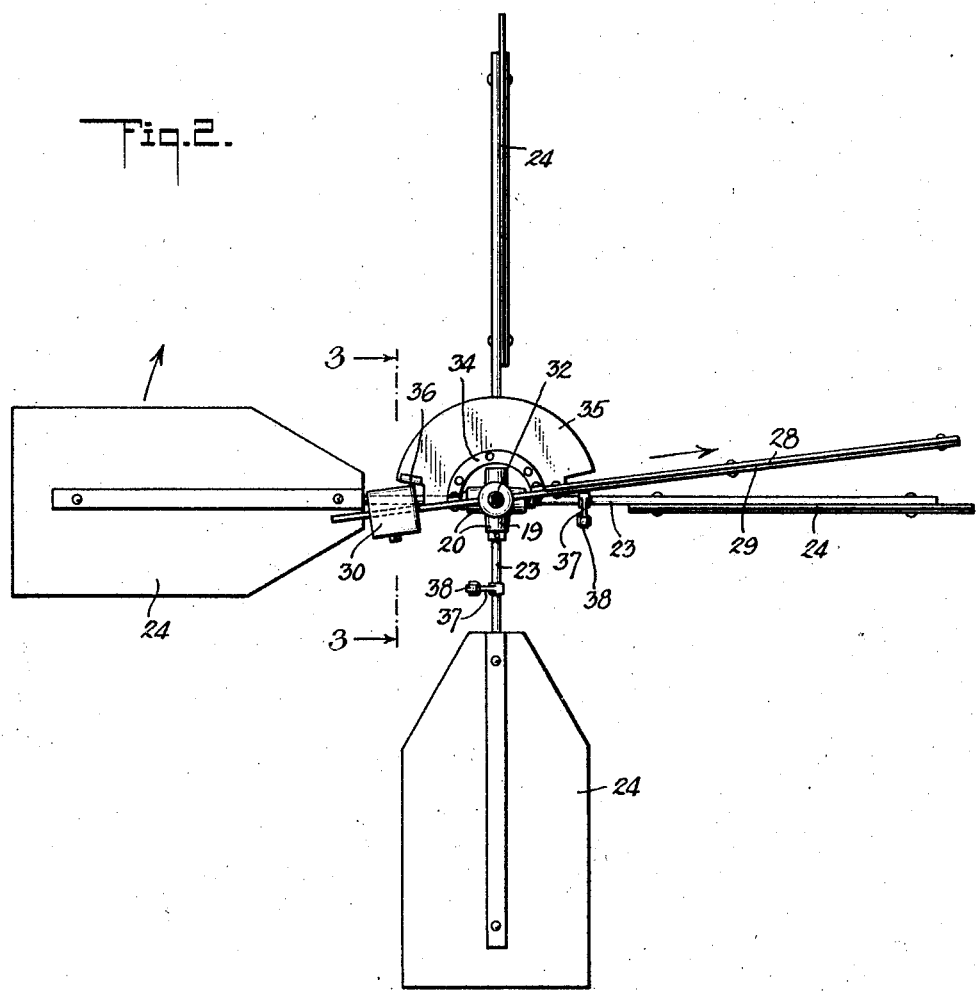
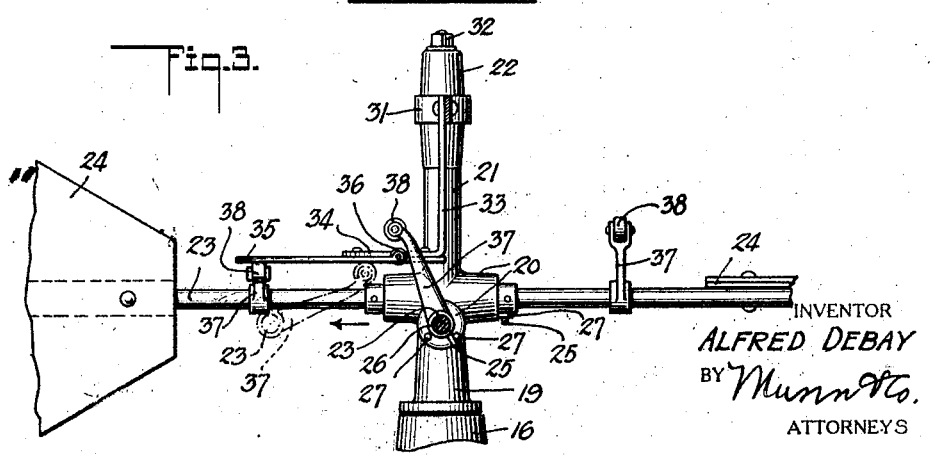

Patented June 2, 1925.

1,540,609

UNITED STATES PATENT OFFICE.

ALFRED DEBAY, OF SAN DIEGO, CALIFORNIA.

WINDMILL.

Application filed January 19, 1924. Serial No. 687,298.

*To all whom it may concern:*

Be it known that I, ALFRED DEBAY, a citizen of the United States, and a resident of San Diego, in the county of San Diego and State of California, have invented certain new and useful Improvements in Windmills, of which the following is a specification.

My invention relates to wind mills, and a purpose of my invention is the provision of a wind mill of the rotary type having a plurality of blades mounted for feathering movements, and vane-controlled means which operates to automatically feather the blades at the proper interval and sequence so that irrespective of the direction of the wind the broad side of the blades will be presented to the wind so as to utilize to a maximum the power of the wind.

I will describe only one form of wind mill embodying my invention and will then point out the novel features thereof in claims.

In the accompanying drawings,

Figure 1 is a view showing in side elevation one form of wind mill embodying my invention;

Figure 2 is a top plan view of the blades and feathering means shown in Figure 1;

Figure 3 is an enlarged sectional view taken on the line 3—3 of Figure 2; and

Figure 4 is a sectional view taken on the line 4—4 of Figure 1.

Referring specifically to the drawings, in which similar reference characters refer to similar parts, my invention in its present embodiment comprises a skeleton tower 15 upon the upper end of which is secured a guide bearing 16 through which extends a shaft 17. The lower end of the shaft is journaled in a bearing 18 supported in or on the base of the tower 15. The upper end of the shaft 17 extends beyond the bearing 16 a distance sufficient to accommodate a casing 19 provided with radially disposed sockets 20. This casting 19 includes an upwardly extending sleeve 21 which terminates short of the upper end of the shaft so as to permit the shaft to accommodate a bearing sleeve 22 to which the vane and feathering mechanism is secured.

The sockets 20 rotatably receive rods 23 to the outer ends of which are secured blades 24. These rods 23 are limited in their rotational movement by means of pins 25 (Figure 3) carried by collars 26 fixed to the rods adjacent the sockets 20 for movement between stationary pins 27 secured to the casing 19. Through the medium of these pins the blades 24 which are arranged in pairs disposed at right angles to each other are capable of feathering movement to occupy horizontal or vertical position. As illustrated, the blades of each pair are disposed at right angles to each other so that when one blade is in vertical position the other blade occupies horizontal position.

The means for automatically feathering the blades includes a vane 28 secured to an arm 29 and counter-balanced by a weight 30. At a point between its ends the arm 29 is secured to a ring 31 fixed to the bearing sleeve 22, and it will be noted that the sleeve 22 is confined upon the upper end of the shaft 17 by means of a nut 32 engaging the threaded end of the shaft. Depending from the arm 29 at opposite sides of the sleeve 22 are the vertical portions 33 of a bracket including a curved intermediate portion 34 to which is secured a flat cam 35. This cam 35 is provided at its ends with rollers 36 adapted to be engaged by arms 37 secured to the rods 23. The free ends of the arms 37 carry rollers 38, the purpose of the rollers 36 and 38 being to eliminate friction, as will be understood.

In operation, the vane 28 is free to rotate upon the shaft 17 and to thus respond to the action of the wind, its position defining the direction of the wind, as will be understood. Through the medium of the vane, the cam 35 is automatically positioned to effect feathering of the blades 24 at the proper instant and for the desired interval during each revolution of the blades, and in the following manner: With one blade 24 of each pair in vertical position as shown in Figure 2, the arm 37 of one blade has engaged the cam 35 so as to swing the arm from the upright position shown in solid lines in Figure 3 to the dotted line position shown in the same figure. During this movement of the arm, the corresponding blade is moved from horizontal to vertical position and maintained in this latter position so long as the arm 37 is beneath the cam 35. However, when the arm rides from beneath the cam the corresponding rod, and consequently the blade, is free to move to horizontal position under the action of the wind, thus presenting to the wind a relatively narrow surface which offers a minimum resistance so as not to impede the operation of the mill. This blade continues to maintain the horizontal position until during rotation of the shaft its arm is again brought into engagement with the cam 35, when the feathering action is repeated. In this manner the several blades of the wind mill are successively moved from horizontal to vertical position and at the proper interval so as to present the broad side to the action of the wind. Should the direction of the wind change, the vane will operate to automatically shift the cam to such a position that the feathering of the blades will occur at the proper instant and in the proper sequence to fully utilize the power of the wind.

Should the wind mill for any reason tend to effect reverse rotation of the shaft 17, such tendency will be checked through the employment of a ratchet wheel 29 fixed to the shaft 17 and engaged by a spring pressed pawl 40. The arrangement of the teeth of the wheel 39 and the operation of the pawl is such as to allow the shaft to rotate in one direction only. The power generated by the wind mill may be converted into useful work through suitable mechanism not shown, which is adapted to be operatively connected to a gear 41 fixed to the shaft 17.

Although I have herein shown and described only one form of wind mill embodying my invention, it is to be understood that various changes and modifications may be made herein without departing from the spirit of the invention and the spirit and scope of the appended claims.

What is claimed is:

1. A wind mill comprising a shaft, a casting fixed to the shaft, sockets formed in the casting, rods rotatably mounted in the sockets, means for limiting the rotational movement of the rods, blades carried by the rods, arms fixed to the rods, rollers carried by the arms, a sleeve rotatably mounted on the shaft, an arm fixed to the sleeve, a vane secured to the arm, a counter-weight for the vane, a bracket secured to the arm, a cam secured to the bracket and positioned to successively engage the first arms during rotation of the blades for effecting a feathering of the latter, and rollers carried by the cam so as to be engaged by the arms.

2. A windmill comprising a shaft rotatable in one direction, a casting fixed to the shaft, sockets formed in the casting, rods rotatably mounted in the sockets, blades carried by the rods, arms fixed to the rods, rollers carried by the arms, a pin fixed to each of the arms, pairs of spaced pins fixed to each of said sockets and between which said first pins are adapted to move to limit the rotational movement of the arms, a sleeve rotatably mounted on the shaft, an arm fixed to the sleeve, a vane secured to the arm, a counterweight for the vane, a bracket secured to the arm, a segmental plate carried by the bracket forming a cam surface and positioned to be successively engaged by the first arms during rotation of the blades for effecting a feathering of the latter, and a roller mounted on one edge of the cam so as to be engaged by the arms.

3. A windmill comprising a shaft, rods rotatably mounted upon the shaft, means for limiting the rotational movement of the rods, blades fixed to the rods, arms fixed to the rods, rollers carried by the arms, a segmental plate freely mounted on the shaft and positioned in the path of movement of said arms, said arms being partly rotated by engaging said plate and adapted to travel beneath the plate, and a roller carried by said plate and positioned so as to be successively engaged by said arms to provide a rolling contact between the arms and the plate.

ALFRED DEBAY.